United States Patent [19]

Lowen et al.

[11] 4,393,690
[45] Jul. 19, 1983

[54] FORCE BALANCING TECHNIQUES FOR COMPLEX CYCLICALLY MOVING PLANAR LINKAGES

[75] Inventors: Gerard G. Lowen, Wyckoff; Stephen J. Tricamo, Norwood, both of N.J.

[73] Assignee: Research Foundation of the City University of New York, New York, N.Y.

[21] Appl. No.: 262,826

[22] Filed: May 12, 1981

[51] Int. Cl.³ .............................................. G01M 1/22
[52] U.S. Cl. ........................................ 73/66; 73/462
[58] Field of Search ...................... 73/66, 65, 460, 462; 364/463, 508

[56] References Cited

U.S. PATENT DOCUMENTS

| | | | |
|---|---|---|---|
| 1,746,352 | 2/1930 | Hem | 73/65 |
| 1,908,786 | 5/1933 | Pioch | 73/65 X |
| 2,282,052 | 5/1942 | Hem | 73/65 |
| 3,076,342 | 2/1963 | Hilgers | 73/462 |
| 3,077,781 | 2/1963 | Silver | 73/465 |
| 3,751,987 | 8/1973 | Whitmore | 73/465 |
| 4,046,017 | 9/1977 | Hill | 73/464 |
| 4,090,244 | 5/1978 | Altwein | 73/462 |

FOREIGN PATENT DOCUMENTS 905932 9/1962 United Kingdom .................... 73/66

OTHER PUBLICATIONS

General Motors "Balance Engineering Manual" (3rd Edition) p. 93, The Short Engine Approach, 4/19.
Transactions of the ASME Journal of Mechanical Design; "A New Concept for Force Balancing Machines for Planar Linkages Part 1: Theory" and A New Concept for Force Balancing Machines for Planar Linkages Part 2: Application to Four-Bar Linkage and Experiment, by S. J. Tricamo and G. G. Lowen (Paper No. 80-DET-73 and 80-DET-74).

*Primary Examiner*—James J. Gill
*Attorney, Agent, or Firm*—Laurence R. Brown

[57] ABSTRACT

This invention provides a technique for reducing shaking forces in n-bar type planar linkages. Thus a linkage is reciprocated and the shaking forces determined in two different coordinates of the plane of operation. With information on crank arms, operating position and velocity of the reciprocating linkage, the relationship $F_s = Ma$ furnishes balancing equations which may be solved by calculation using detected readings at a plurality of linkage positions to give the masses and positions of corrective balancing members for reducing the shaking forces. Instrumentation primarily comprises a force platform such as a piezoelectric device upon which the linkage is mounted for cyclic reciprocation to produce dynamic force signals along a set of two coordinates in the plane of operation at various linkage positions. Appropriate data processing equipment then calculates from the balancing equations the corrective masses and their positions for reducing the shaking forces. The calculation can be automatically done in computing equipment, and the shaking forces along the coordinates can be displayed on an oscilloscope for analysis and indication of the balance.

32 Claims, 5 Drawing Figures

FORCE BALANCING TECHNIQUES FOR COMPLEX CYCLICALLY MOVING PLANAR LINKAGES

TECHNICAL FIELD

This invention relates to balancing techniques for removing vibration from cyclically movable mechanisms and more particularly it relates to balancing of the class of linkages having a plurality of linked bars movable in one or more planes.

BACKGROUND ART

In cyclically movable or reciprocating linkages used in machinery, automobiles and the like, because of unavoidable manufacturing tolerances and unpredictable non-homogeneity of materials, vibration cannot be removed by system or machinery design alone. Rather each equipment will need be fully force balanced by proper positioning of counterweights.

However, such positioning has in the past been confined mostly to rotating members in which the counterweights are all attached to a single shaft. Balancing of automobile tires mounted on a wheel for rotation about the wheel axle, is an example. The complexity of the parameters involved in balancing of a four bar or n-bar linkage reciprocating in a single plane by determination of the required correction masses and positioning to balance shaking force components kinematically has in the past prevented adoption of any general process or solution.

The general principles and problems of vibration in such reciprocating objects as connecting rods for automobile engines representative of the state of the art are set forth in U.S. Pat. No. 2,282,052—H. O. Hem—May 5, 1942. Thus, a static balance is attained by comparison with a master rod in a mechanism indicating weights at two end bearing regions of the connecting rod and permitting a weight calibration necessary to attain balance.

Dynamic balancing machines have been proposed such as set forth in U.S. Pat. No. 3,751,987—B. E. Whitmore—Aug. 14, 1973. Electric balancing techniques provide a cathode ray polar coordinate plan position display. Magnetic or optical transducers are used at bearings to derive signals from a workpiece rotating thereon. Thus, the size of a correction mass, the radius from center and angle may be derived.

U.S. Pat. No. 3,077,781—S. H. Silver—Feb. 19, 1963 describes a dynamic balance system operable to detect and correct balance in two axially separable planes of a rotor rotated in bearings which permit vibration in a plane including the rotor axis.

Other piston or connecting rod balance testing machines are represented by U.S. Pat. Nos. 1,746,352—H. O. Hem—Feb. 11, 1930 and 1,908,786—W. F. Pioch—May 16, 1933.

None of these systems, however, can balance a complex interconnected n-bar cyclically reciprocating mechanism.

It is therefore a general objective of this invention to provide techniques for force balancing of machines or linkage sub-assemblies thereof having interconnected n-bar planar linkages.

Other objects, features and advantages of this invention will be found throughout the following description, drawings and claims.

DISCLOSURE OF THE INVENTION

This invention permits the dynamic force balancing of planar reciprocating mechanisms such as n-bar linkages by determination of the locations and magnitudes of corrective masses. Such a planar linkage has all components movable in plane motion in parallel planes.

It provides for the technique and method of balancing a range of mechanisms including metal stamping or printing presses, feed mechanisms, sewing machines, engines and miscellaneous reciprocating mechanisms.

It provides a method and corresponding instrumentation for dynamic analysis of the particular mechanisms to be balanced so that the correction masses and locations can be automatically determined and the mechanism characteristics can be visually displayed.

Thus, the vibration or shaking forces along two coordinates in a movement plane of the linkage while in dynamic operation under the expected operational conditions are measured for a plurality of linkage positions in the linkage cycle. From these data and known linkage characteristics the corrective information is derived in terms of balancing mass magnitudes and positions necessary to materially reduce the sharking forces.

A typical embodiment of the apparatus for establishing balance includes a variable speed drive motor, plus gearbox if necessary, connected to cyclically drive the linkage through its reciprocation at the desired operating speed or speed ranges. An angularly calibrated codewheel and corresponding timing mechanism will determine the linkage angle and speed.

Further sensors determine the shaking force components along two coordinates such as x-y axes in the linkage plane of reciprocation. These forces are sampled at n different angular positions of the linkage where n is at least two.

The forces may be displayed for visual observation, for example, on an oscilloscope, where the shaking forces during the reciprocation may be observed, thereby providing an angular positional display of not only the position but also the relative magnitude of the shaking forces. Balancing may be accomplished by proper calibration of the magnitudes and angles of the displayed forces, or by appropriate computerized analysis of the shaking forces. In the latter case printout of the desired balancing data can be produced.

A detailed disclosure of the theory and examples of this invention is set forth for those skilled in the art in a two-part paper by the inventors entitled "A New Concept for Force Balancing Machines for Planar Linkages" presented at the ASME Design Engineering Technical Conference, Beverly Hills, Calif., Sept. 28–Oct. 1, 1980 (Paper No. 80-DET-73) printed in the Transactions of the ASME Journal of Mechanical Design. This is incorporated in its entirety herein by reference.

PREFERRED EMBODIMENTS OF THE INVENTION

In accordance with the theory set forth in the above referenced articles, it is shown that n-bar linkages can be balanced by application of the relationship $F_s = Ma$ where $F_s$ is the shaking force, M the mass of the linkage, and a the acceleration of the center of mass. Thus, mass-distance products associated with the center of mass trajectory for a linkage are differentiated twice and result in a *solvable set of balancing equations* for either four bar or n-bar linkages when expressed for at least two mechanism positions in terms of experimental value of the shaking forces and kinematic quantities.

The result of this is the possibility of removing the residual shaking forces by determining the required n corrective mass-distance products with residual shaking forces experimentally determined to relate with the kinematic quantities derived from the linkage parameters as it is operated through its reciprocation cycle.

Figure 1:
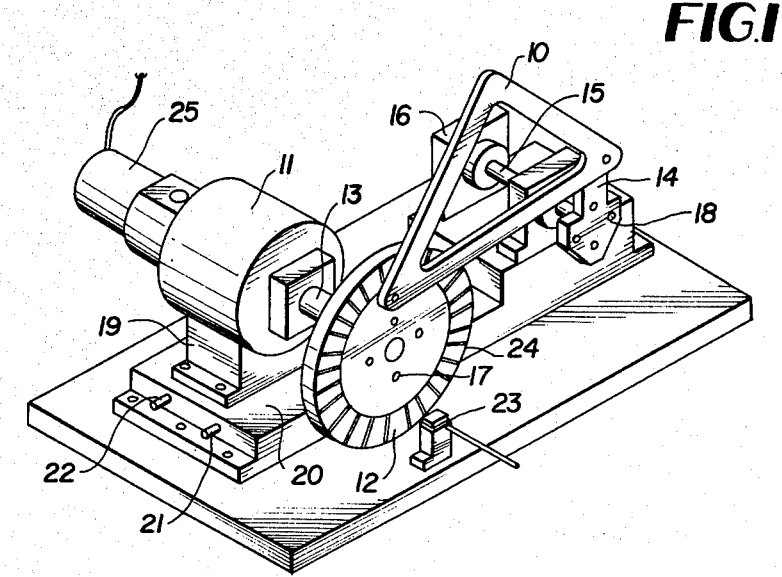
FIG. 1 is a perspective sketch of instrumentation embodying the invention for balancing a planar n-bar linkage.

It is thus feasible with the mechanism set forth in FIG. 1 to derive shaking force components which will permit the determination of corrective mass-distance relationships permitting the linkage theoretically to eliminate shaking forces. In actual practice the application of the theory has proven that the shaking forces are materially reduced.

Thus, with reference to FIG. 1 a four bar linkage with coupler link member 10 is cyclically reciprocable by means of input motor 11 rotating the disc member 12 through the motor axle 13 bearing shaft. Similarly an output crank arm 14 rotates on axle 15 in bearing blocks 16. Balancing holes 17, 18 are respectively located in the disc 12 and crank arm 14 for more accurate counterbalancing in accordance with this invention.

The two bearing assemblies 16 and 19 are mounted on force block 20, and is typically a piezoelectric element from which shaking forces may be derived in two coordinates such as x, y axes in the plane or a parallel plane to the plane of movement of the linkage and coupled to appropriate amplifiers, etc. by the two respective cable connections 21, 22. Preferably both bearings are mounted on a single force platform 20 in order to generate a signal set of signals representing the shaking forces for the composite linkage assembly.

Figure 3:
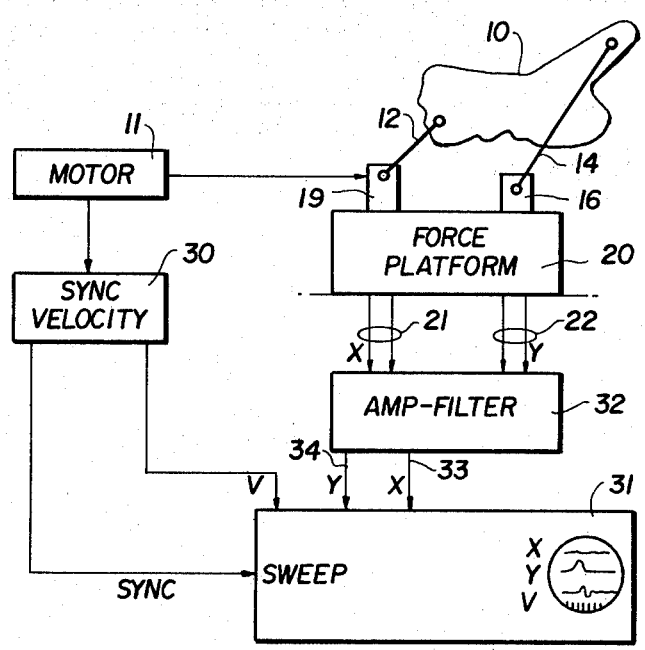
FIG. 3 is a block schematic diagram of a system for display of the shaking force characteristics of an n-bar linkage provided in accordance with the teachings of this invention.

Other detectors are provided, such as the photo pickup 23 which scans the 72 equally spaced reflecting strips 24 as the linkage reciprocates to provide indications of the movement of the linkage through the cycle and thereby identifying the linkage phase for such use as shown on the bottom trace of the oscilloscope screen in FIG. 3, for example. Wider stripes or coded stripes may indicate key cycle phase-positions such as 0°, 90°, etc. points. Also these signals when processed with a time clock and counter can provide a velocity indication of increments per unit time which also may be displayed (V FIG. 3) or differentiated to produce an acceleration measurement. The disc angles and linkage phases may be appropriately aligned by relative adjustment means not shown. Other more precise signals may be used for angular velocity derivation of the input link such as an optical angular encoder 25 capable of one half degree resolution signals, for example.

Figure 2:
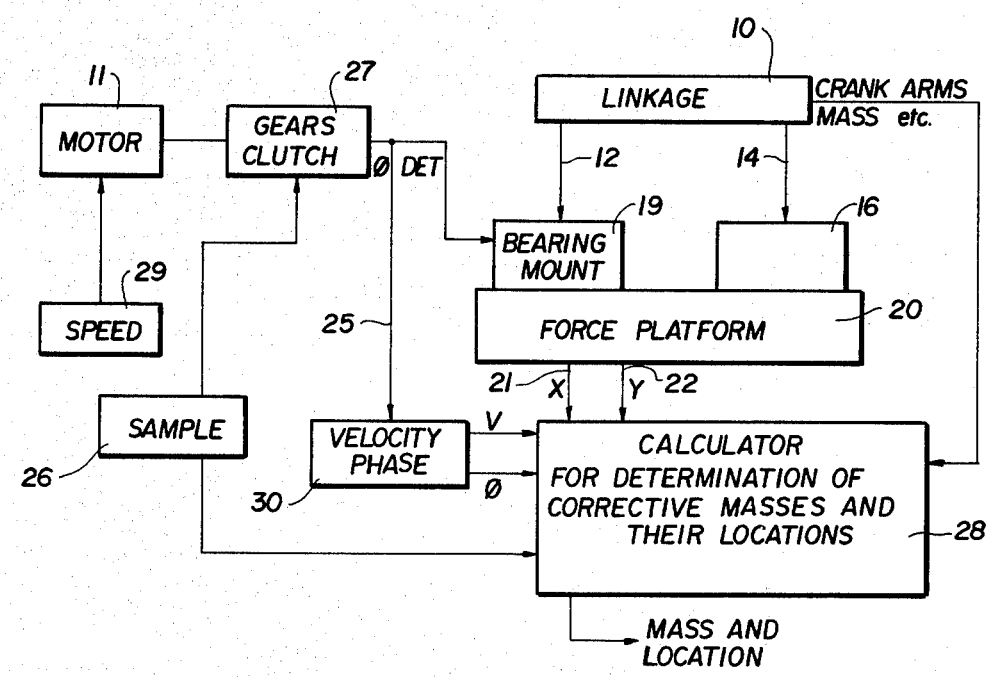
FIG. 2 is a block schematic diagram of a system for determining the mass and position of a corrective member reducing shaking forces in accordance with the teachings of this invention.

The foregoing arrangement is shown in block diagram form in FIG. 2 using similar reference characters for purpose of comparison. In order to eliminate any unbalance contribution of the motor 11 from the experimentally derived shaking force components, it is preferably uncoupled by means of sampler 26 and clutch 27 at an instance the force signals x, y are sampled in the calculator 28. Other decoupling means such as universal joints or flexible coupling members may also be able to isolate the motor shaking forces as well as electric filters if the frequencies are appropriate. As noted in the clutch box 27, gearing is used as appropriate, and the motor 11 is preferably a variable speed motor with speed control device 29 to establish the typical linkage reciprocation speed in its normal usage pattern. The velocity-phase device 30, formerly described provides both phase $\phi$ and velocity V data.

The calculator 28 may be analog or digital for processing the signals available in accordance with the foregoing described theory. Preferably a general purpose computer is programmed for analysis of the data at multiple positions in the reciprocation cycle to provide printout of the corrective mass-position data showing where corrective mass increments are to be placed for reducing the shaking forces. As indicated the calculator derives acceleration a from the velocity V and uses the shaking force signals F in the solutions hereinbefore described.

A similar block diagram representation in FIG. 3 sets forth the oscilloscope 31 as a visual display mechanism for analysis of the shaking forces. Appropriate amplifiers and filters 32 are used to derive the x and y output signals 33, 34 for producing the x, y traces in the manner set forth in the referenced paper part 2. The velocity trace and the phase position markers are also displayed for side-by-side comparison or on single trace displays. Thus, deviations from balance may be visually analyzed in the measured coordinates. From this visual display the nature of corrective masses may be studied and experimentally determined if desired to remove unbalance conditions, although the more complete analysis of calculator 28 hereinbefore described is preferred.

Figure 4:
FIG. 4 is a diagrammatic view of an engine representative of an n-bar linkage that may be analyzed and balanced in accordance with the teachings of this invention.

FIG. 4 is a sketch of a typical air cooled head and one cylinder engine piston 41 and crank 42 which is a planar linkage n-bar array that can be processed in the aforedescribed manner for improving balance. This is important for lawn mower, power saw and like operations.

Figure 5:
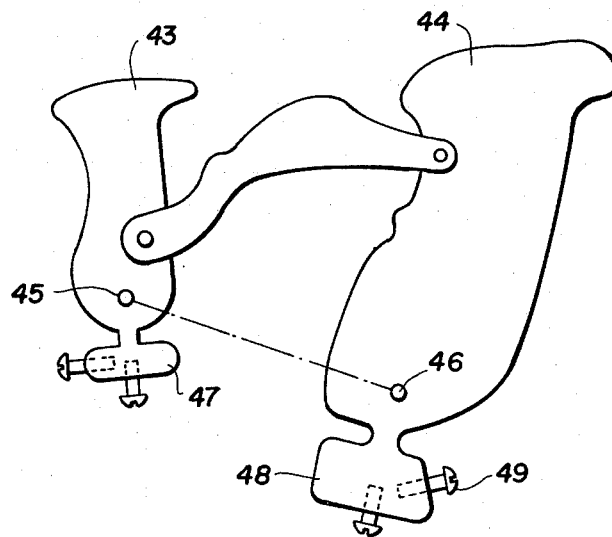
FIG. 5 is a diagrammatic view of a four bar linkage illustrative of the linkages which may be analyzed to determine and correct shaking forces in accordance with this invention.

FIG. 5 is an arbitrary sketch of a four bar linkage with crank arms 43, 44 rotating about shafts 45, 46 respectively. Counterbalance masses 47, 48 may thus be provided with micro-adjustments illustrated by screws 49, etc. so that those shaking forces not eliminated within manufacturing tolerances may be reduced by applying the teachings of this invention. Thus, the position of the adjustments could readily be calculated and printed out by the FIG. 2 configuration by making a test rig such as FIG. 1 for the particular linkage to be tested and processing data in the manner described. Accordingly, it is clear that this invention has provided novel techniques and apparatus which permits the analysis of shaking forces and the determination of corrective masses and positions for reducing shaking forces experimentally observed. Accordingly, those novel features believed descriptive of the spirit and nature of the invention are defined with particularity in the claims.

INDUSTRIAL APPLICATION

A method and corresponding apparatus permits the dynamic balancing of n-bar planar linkages to reduce shaking forces. The linkages are dynamically reciprocated on a force platform which detects the shaking forces permitting calculation of the masses and positions of corrective balancing masses for reducing the shaking forces.

We claim:

1. The method of fully force balancing cyclically moving planar n-bar linkages to reduce residual shaking forces comprising the steps of,
   cyclically moving the planar linkage through its movement cycle,
   determining during the cyclic movement in the plane of movement the shaking forces ($F_s$) along a set of two coordinates, such as the x and y axes, for a plurality of angular sensing positions in the movement cycle,
   determining the angular position and angular velocity of the input link at said plurality of positions to thereby provide a plurality of sets of data,
   and establishing from the plurality of sets of data determining the shaking forces at the plurality of sensing positions with the help of the balancing equations the required corrective mass and location of counterbalance structure for reducing the shaking forces $F_s$ of both fundamental frequencies and harmonics of the cyclic movement.

2. The method defined in claim 1 including the steps of,
   mounting the planar linkage for cyclic movement upon a force platform, and
   establishing the shaking force coordinate components by measuring in respective coordinates the forces introduced to the platform by the reciprocating linkage.

3. The method defined in claim 1 including the step of determining the angular position of the linkage in its cycle by means of an angular encoder moving cyclically with said linkage.

4. The method defined in claim 1 including the step of coupling variable speed motor means for cyclically driving and thereby reciprocating the linkage at a predetermined speed.

5. The method defined in claim 4 including the steps of,
   cyclically rotating two rotary members connected by a bar link in respective bearing assemblies,
   and mounting the two bearing assemblies on a common force platform from which said shaking forces $F_s$ in the two coordinates are derived.

6. The method defined in claim 1 including the steps of determining the velocity of the angular movement and differentiating the determined velocity to derive the angular acceleration.

7. The method defined in claim 1 including the step of establishing the shaking forces at variable cyclic reciprocation speeds.

8. The method defined in claim 1 including the step of visually displaying the shaking force $F_s$ on a monitor.

9. The method defined in claim 1 including the step of determining the location, direction and distance from a reference point of corrective counterbalance masses.

10. The method defined in claim 1 including the step of mounting the linkage on a force platform and reciprocating the linkage to determine the shaking forces by measurement of forces in said platform.

11. The method defined in claim 10 including the more detailed step of mounting the linkage on the force platform by means of bearing support means disposed perpendicular to at least one rotation axis position in the linkage plane.

12. The method defined in claim 11 including the step of providing said bearing support at two locations, namely at force input and force output cranking positions on the linkage.

13. The method defined in claim 10 including the more detailed steps of mounting the linkage on a single piezoelectric force platform and determining the shaking forces by piezoelectric signals induced in two coordinates in the platform disposed in the plane of movement of the linkage.

14. Apparatus for dynamic analysis of the shaking forces of cylically moving planar linkages, comprising in combination, means for moving the linkages over a cyclic movement pattern, detection means for determining cyclic shaking forces in the plane of the linkage at a plurality of points in the movement pattern, and computation means for determining from the shaking forces and the movement pattern characteristics of balancing masses to modify the linkage mass for reducing the shaking forces of fundamental and harmonic frequencies of the cyclic frequency.

15. Apparatus as defined in claim 14 including means for determining the magnitudes of the balancing masses required for substantially reducing the shaking forces.

16. Apparatus as defined in claim 14 wherein the means for moving the linkages comprises a variable speed motor.

17. Apparatus as defined in claim 14 wherein the detection means for determining the shaking forces comprises a force platform upon which the linkage is supported, with means on the force platform indicating forces in two different coordinates in the plane of the linkage.

18. Apparatus as defined in claim 14 wherein the computation means comprises oscilloscope means displaying visually the shaking force amplitude on one coordinate and the position of the linkage in the cyclic movement pattern another coordinate.

19. Apparatus as defined in claim 14 including computation means for indicating the positioning of the balancing masses.

20. Apparatus as defined in claim 14 including means deriving the magnitude of the balancing masses required to substantially reduce shaking forces.

21. Apparatus as defined in claim 14 including further detection means determining the angular velocity of the input link, wherein the computation means comprises means establishing from the balancing equations the magnitudes of the masses for substantially reducing the shaking force, wherein the value of $F_s$ is sensed by said detection means coupled to the linkage and the means of computing the angular acceleration by differentiating the detected angular velocity.

22. Apparatus as defined in claim 14 including motor driving means and a motor disconnect clutch in said means for moving the linkages, and sampling means for periodically disconnecting the clutch while activating said sampling means to detect the shaking forces thereby to isolate any motor shaking forces from the detected shaking forces.

23. Apparatus as defined in claim 14 wherein the detection means comprises a force block with detection devices thereon, and bearing means is affixed to the force block for moving said linkage through its cyclic cranking pattern and thereby transmitting the shaking forces to said detection devices.

24. Apparatus as defined in claim 14 wherein the means moving the linkage is provided with means for indicating the position of the linkage in the movement cycle.

25. Apparatus as defined in claim 14 wherein the means moving the linkage is provided with means indicating the movement velocity.

26. The method of analysis of the shaking forces in linkages with all components reciprocating in a plane, comprising the steps of,
    providing a mechanism reciprocating the linkage,
    detecting the shaking forces in the reciprocating linkage in said plane at a plurality of the mechanism positions in the reciprocation cycle,
    and displaying from the detected shaking forces and the linkage reciprocation data representative of the shaking forces at a plurality of positions in the reciprocation cycle.

27. The method of claim 26 wherein the shaking forces are detected in two coordinate directions in said plane, and the reciprocation data in each coordinate is displayed.

28. The method of determining corrective masses and mass positions for reducing shaking forces in linkages with all components reciprocating in a plane, comprising the steps of,
    reciprocating the linkage,
    detecting in a pair of coordinate directions in said plane the shaking forces for a plurality of linkage positions, and
    calculating from the balancing equations the corrective masses and positions for corrective changes reducing the shaking forces.

29. Apparatus for dynamic analysis of the shaking forces of planar linkages, comprising in combination,
    means moving the linkages over a cyclic movement pattern,
    detection means for determining the shaking forces and angular velocity in the plane of the linkage at a plurality of points in the cyclic movement pattern of the linkages to derive a plurality of sets of data,
    and means for processing the detected plurality of sets of data for analysis for the shaking forces to derive corrective masses and positions for reducing shaking at the cyclic frequency and its harmonics.

30. The apparatus defined in claim 29 wherein the means for processing the shaking forces comprises a visual display device for displaying the detected shaking force magnitudes at said plurality of cyclic movement positions.

31. The apparatus as defined in claim 30 wherein the visual display device comprises an oscilloscope, the detection means provides a dynamic reading throughout the cyclic movement pattern, and the oscilloscope display provides a trace representative of the entire cyclic movement pattern.

32. The apparatus as defined in claim 29 wherein the means for processing the shaking forces comprises a calculator programmed for computing from the detected shaking forces the mass and position of corrective members for reducing shaking forces.

* * * * *